Oct. 17, 1961 U. HOFMANN 3,004,660

NEEDLE STORAGE DEVICE

Filed March 21, 1956 9 Sheets-Sheet 1

INVENTOR
Ulrich Hofmann
BY
Michael S. Striker
Attorney

NEEDLE STORAGE DEVICE

Filed March 21, 1956

9 Sheets-Sheet 2

INVENTOR
Ulrich Hofmann
By Michael S. Striker
Attorney

INVENTOR
Ulrich Hofmann
By
Michael S. Striker
Attorney

Oct. 17, 1961 U. HOFMANN 3,004,660

NEEDLE STORAGE DEVICE

Filed March 21, 1956 9 Sheets-Sheet 4

INVENTOR
Ulrich Hofmann
By Michael S. Striker
Attorney

Oct. 17, 1961 U. HOFMANN 3,004,660

NEEDLE STORAGE DEVICE

Filed March 21, 1956 9 Sheets-Sheet 5

INVENTOR

Ulrich Hofmann

By Michael S. Striker

Attorney

Oct. 17, 1961 U. HOFMANN 3,004,660

NEEDLE STORAGE DEVICE

Filed March 21, 1956 9 Sheets-Sheet 6

INVENTOR

Ulrich Hofmann

By

Michael S. Striker

Attorney

INVENTOR
Ulrich Hofmann
by
Michael S. Striker
Attorney

Oct. 17, 1961 U. HOFMANN 3,004,660

NEEDLE STORAGE DEVICE

Filed March 21, 1956 9 Sheets-Sheet 8

INVENTOR
Ulrich Hofmann
By
Michael S. Striker
Attorney

INVENTOR
Ulrich Hofmann
By
Michael S. Striker
Attorney 3,004,660

NEEDLE STORAGE DEVICE

Ulrich Hofmann, Ebingen, Wurttemberg, Germany, assignor to Theodor Groz & Sohne & Ernst Beckert, Ebingen, Wurttemberg, Germany Filed Mar. 21, 1956, Ser. No. 572,974
Claims priority, application Germany Mar. 24, 1955
12 Claims. (Cl. 206—66)

Figure 1A:

The present invention relates to a needle storage device.

More particularly, the present invention relates to the neat storage of the fine knitting needles used in the textile industry.

It is extremely important that the needles used in the textile industry be completely straight and that the bent over portion of the needle which bears the point thereof be precisely located with respect to the shaft of the needle, so that the consumer is enabled to insert the needle into the needle bar without any adjustment of the point of the needle being required.

It is to be noted that needles used in the textile industry are conventionally bent at one end portion thereof at substantially right angles to the length of the needle and are also bent at an opposite end thereof substantially parallel to the length of the needle, this opposite bent portion containing the needle point. Up to the present, these needles have been shipped and stored loosely in bags, and this very easily leads to the bending and twisting of the bent portions of the needles.

One of the objects of the present invention is to provide neat storage means whereby the bending or the twisting of the needles stored therein is prevented.

A further object of the present invention is to provide storage means for needles from which means the needles may be very easily removed and without their being damaged in the process.

A still further object of the present invention is to provide transparent storage means for the needles whereby the needles can be protected against damage and may also be constantly observed.

Yet a further object of the present invention is to provide means for arranging the needles side by side, so that any irregularity in the shape of one needle can be observed by comparison with the remaining needles.

With the above objects in view the present invention mainly comprises of a needle storage device comprising holding means for holding at least one end portion of each of a plurality of needles arranged in a row, substantially parallel to one another, and preferably indicates plate means rigidly fixed adjacent one edge portion thereof to the holding means for resiliently deforming the needles along their length to hold the needles firmly in position.

As holding means it is preferable to use a melt-dip substance having a basis of a synthetic resin compound. This substance is liquefied by heating, and is molded to the desired shape by pouring or ejecting it into a mold. The substance freezes very quickly, and thereafter it may immediately be removed from the mold. This synthetic resin can, however, also be poured over the end portions of a row of needles arranged with their shafts parallel to one another, or the needles may be dipped into the liquefied resin so that after the latter cools, a fixing film is formed.

A characteristic feature of this type of holding means is that the metallic needles can be removed therefrom without any residue of the substance adhering to the needles. The holding means may be kept in a frame which in turn is inserted into a storage receptacle. The device of the present invention thereby assures the quick accessibility of selected needles. Even if the holding means and frame are not kept in a receptacle, the needles are nevertheless constantly held in their desired position. Thus this brings about an extremely neat storage arrangement for the needles.

According to a further feature of the invention, those portions of the knitting needles which are bent over substantially parallel to the shaft of the needle, are flexed apart by an elongated deforming means which comprises a bent portion of a plate or frame. During the flexing of the one end portion of the needle by this elongated deforming means, the other end portion of the needle is pressed against the frame or plate to which the deforming means is connected, so that the needles are constantly held firmly in position.

The novel features which are considered as characteristic for this invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1*a* shows a partly sectioned side elevational view and

Figure 1B:
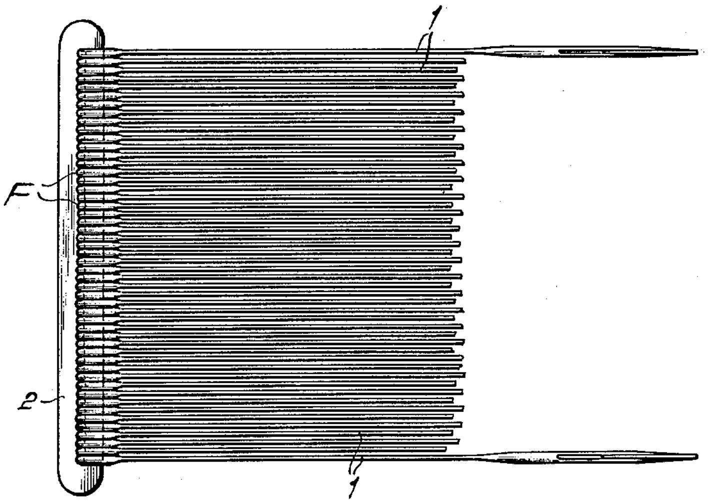
Figures 2A, 2B:
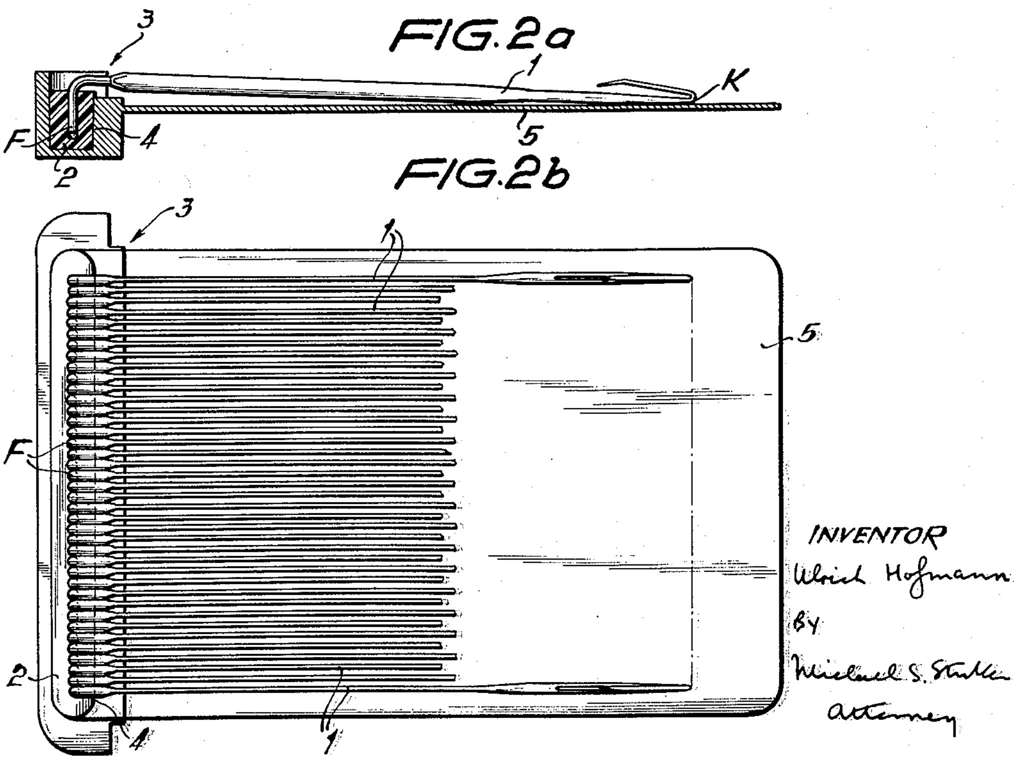

FIG. 1*b* shows a plan view of one embodiment of the device of the present invention, a row of needles being arranged in the device;

FIG. 2*a* shows a partly sectioned side elevational view and

Figure 3:
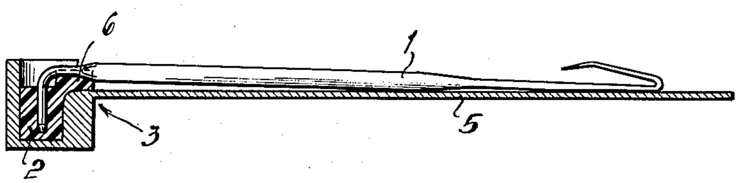
Figure 4A:

FIG. 2*b* shows a plan view of the device illustrated in FIG. 1 inserted into a recess formed in a holding means, a row of needles being shown arranged in the device;

FIG. 3 is a partly sectioned side elevational view of a further embodiment of the device of the present invention, wherein the device shown in FIG. 2 is provided with an additional shoulder;

FIG. 4*a* is an end view and

Figure 4B:
Figure 5A:
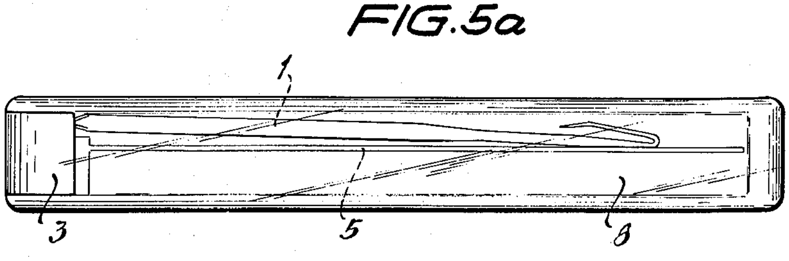
Figure 5B:
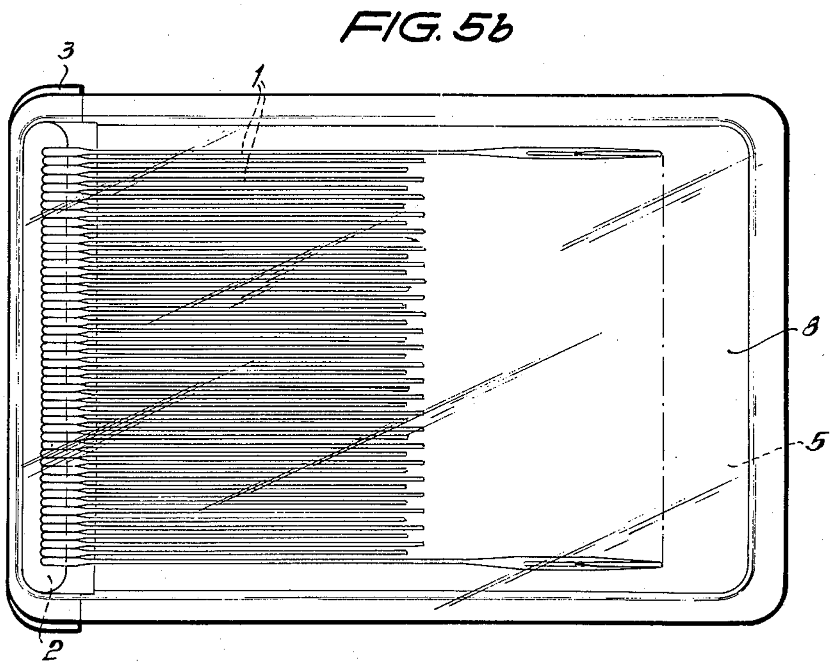
Figure 6A:
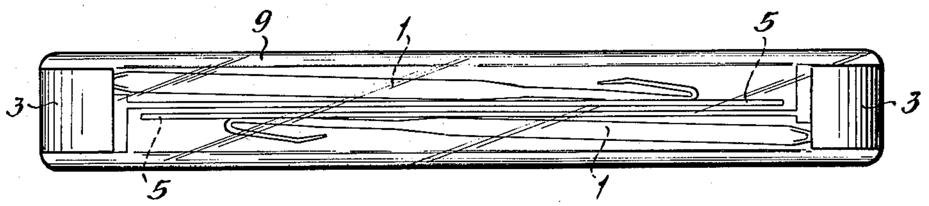

FIG. 4*b* is a plan view of the pair of elastic holding means which are inserted into the recess formed in the holder illustrated in FIG. 2;

FIGS. 5*a*–5*b* show the device illustrated in FIG. 2*a*, in side elevational view and plan view, respectively, inserted into a transparent casing;

FIG. 6*a* shows a side elevational view and

Figure 6B:
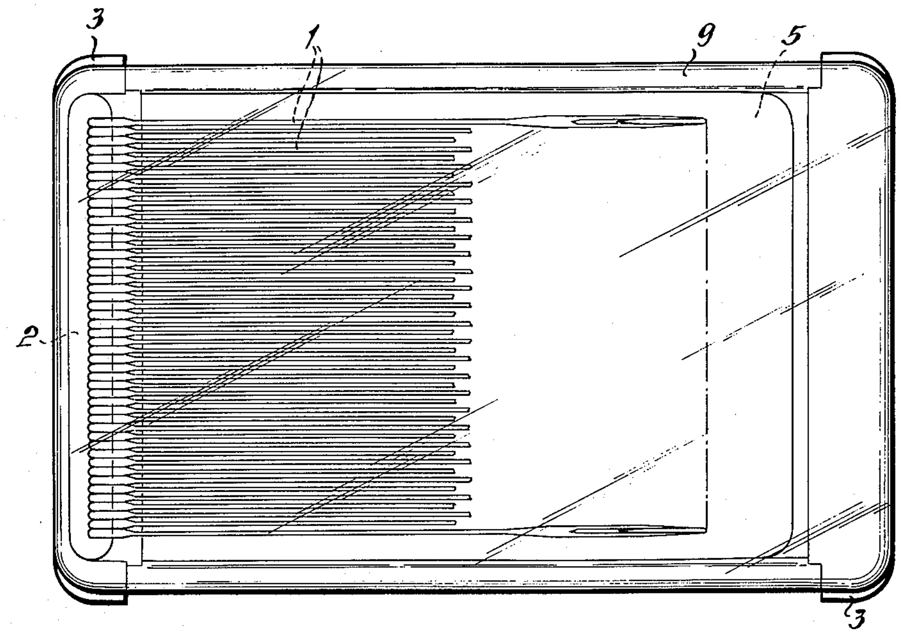
Figure 7:
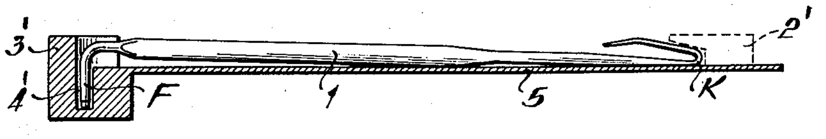
Figure 8A:
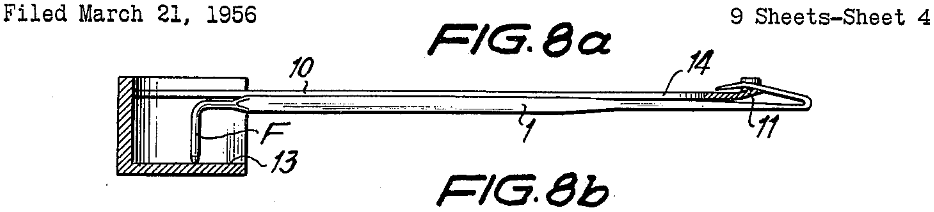
Figure 8B:
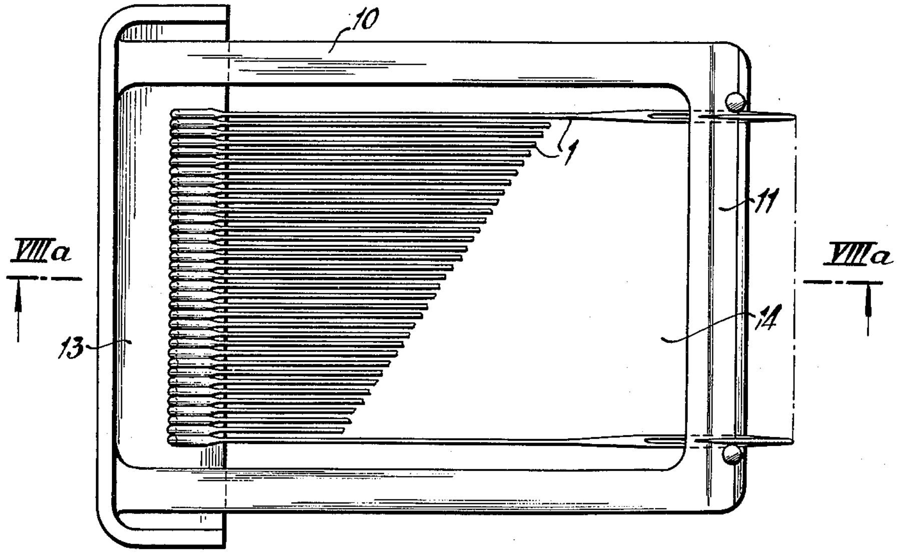
Figure 9A:
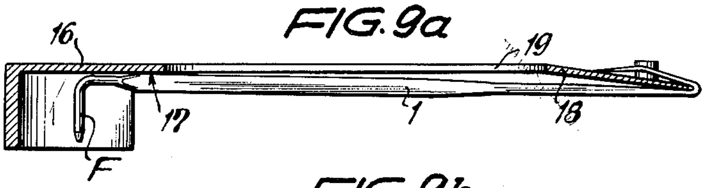
Figure 9B:
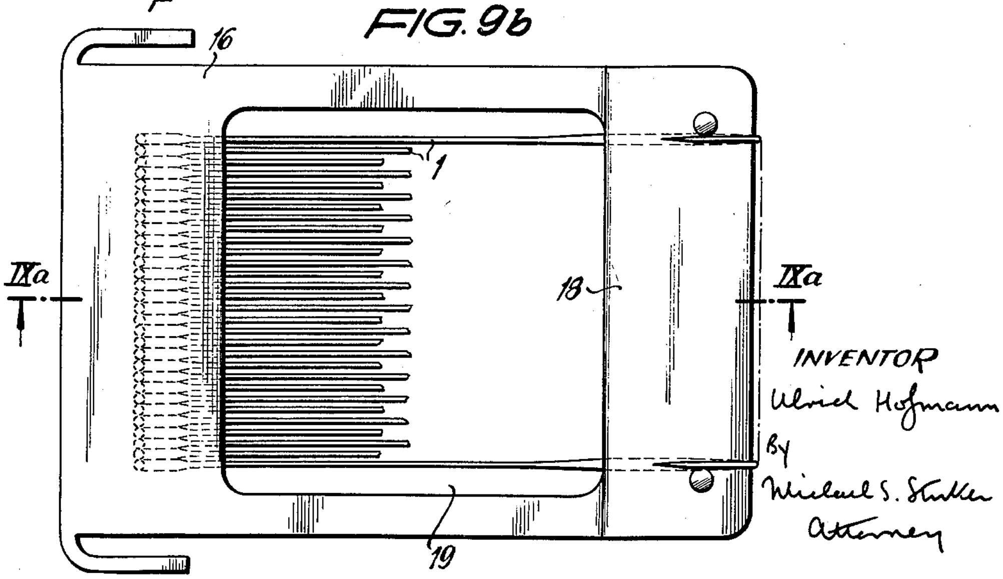
Figure 10A:
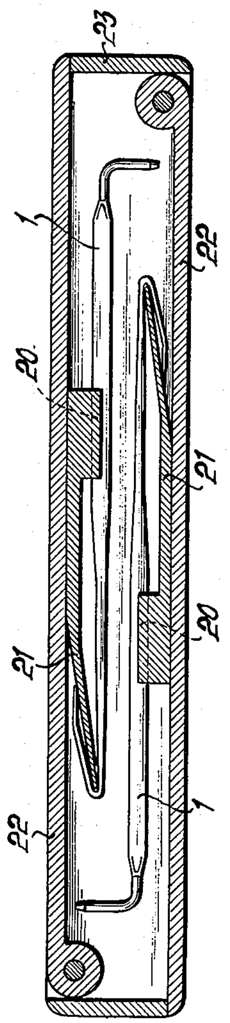
Figure 10B:
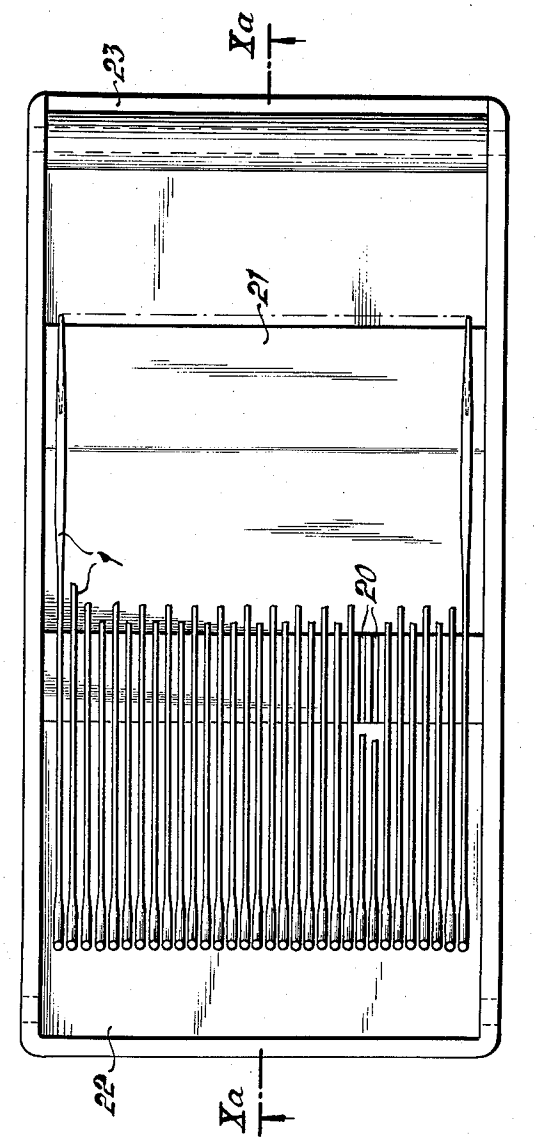
Figures 11A, 11B:
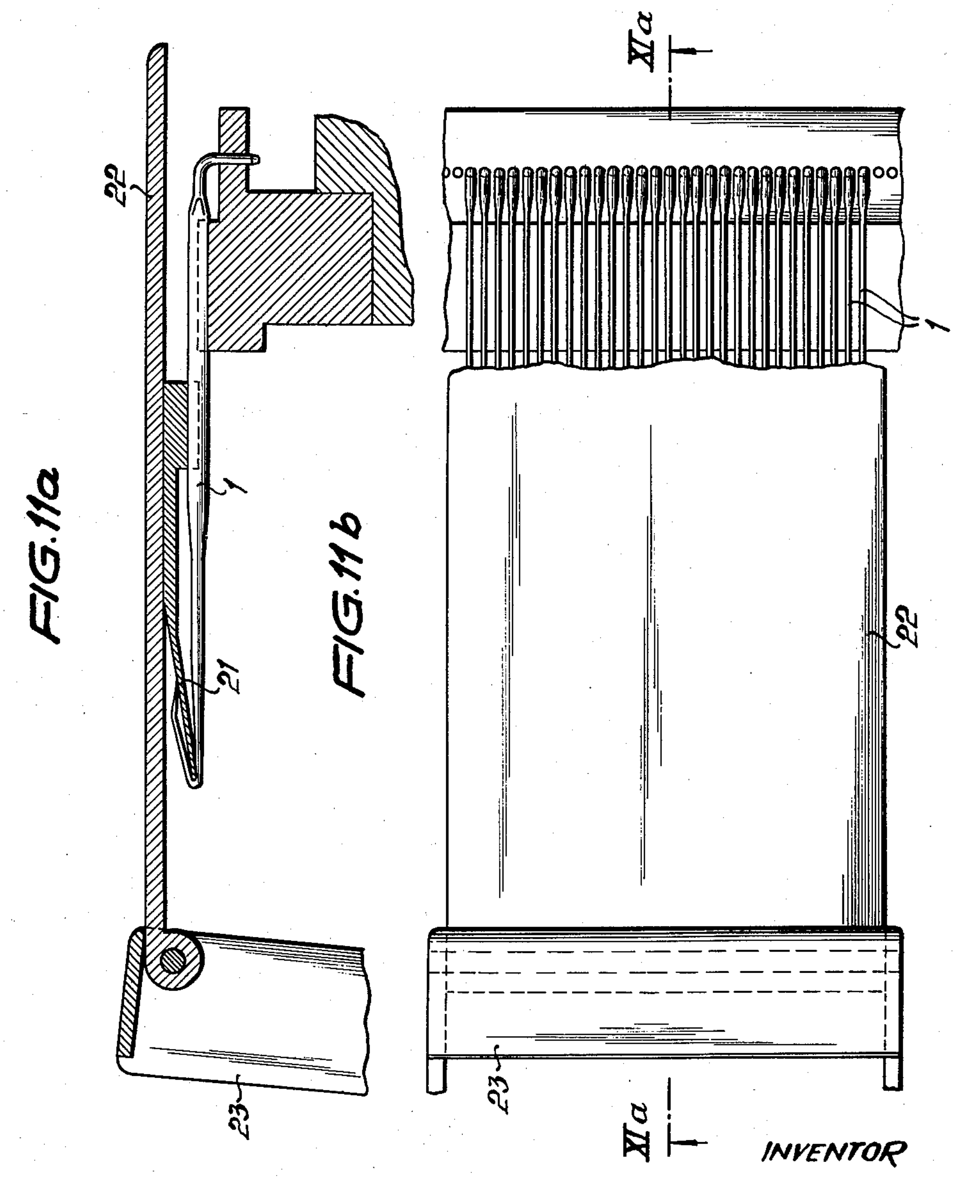
Figure 12A:
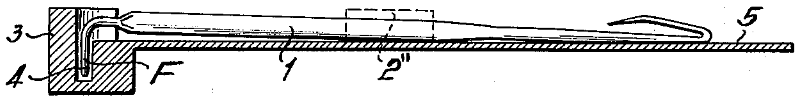
Figure 12B:
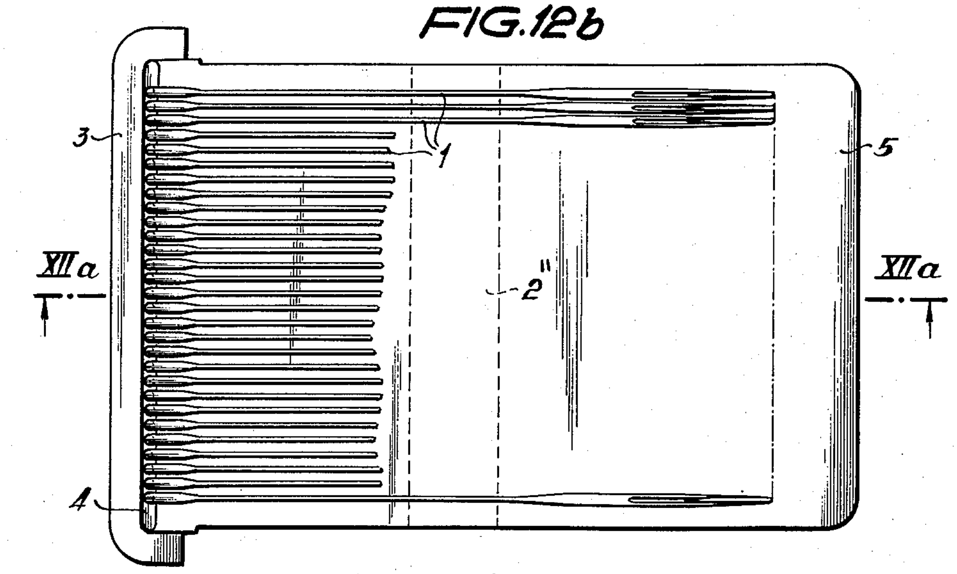
Figure 13A:
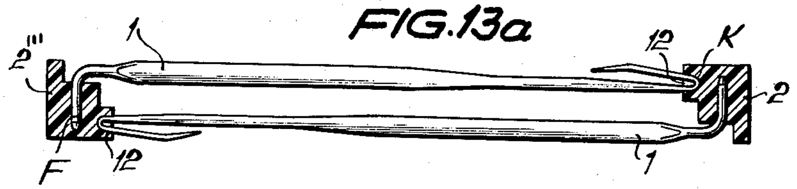
Figure 13B:
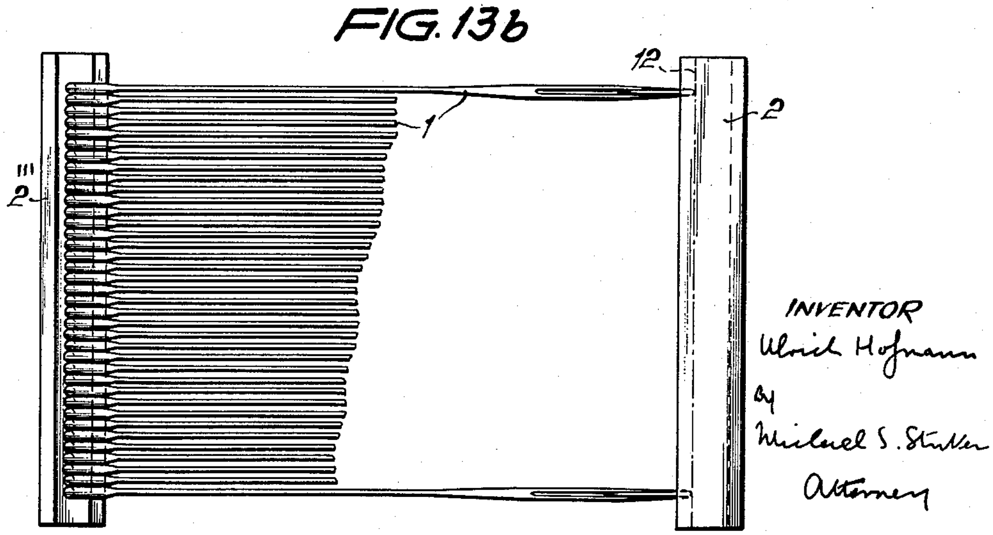
Figure 14:
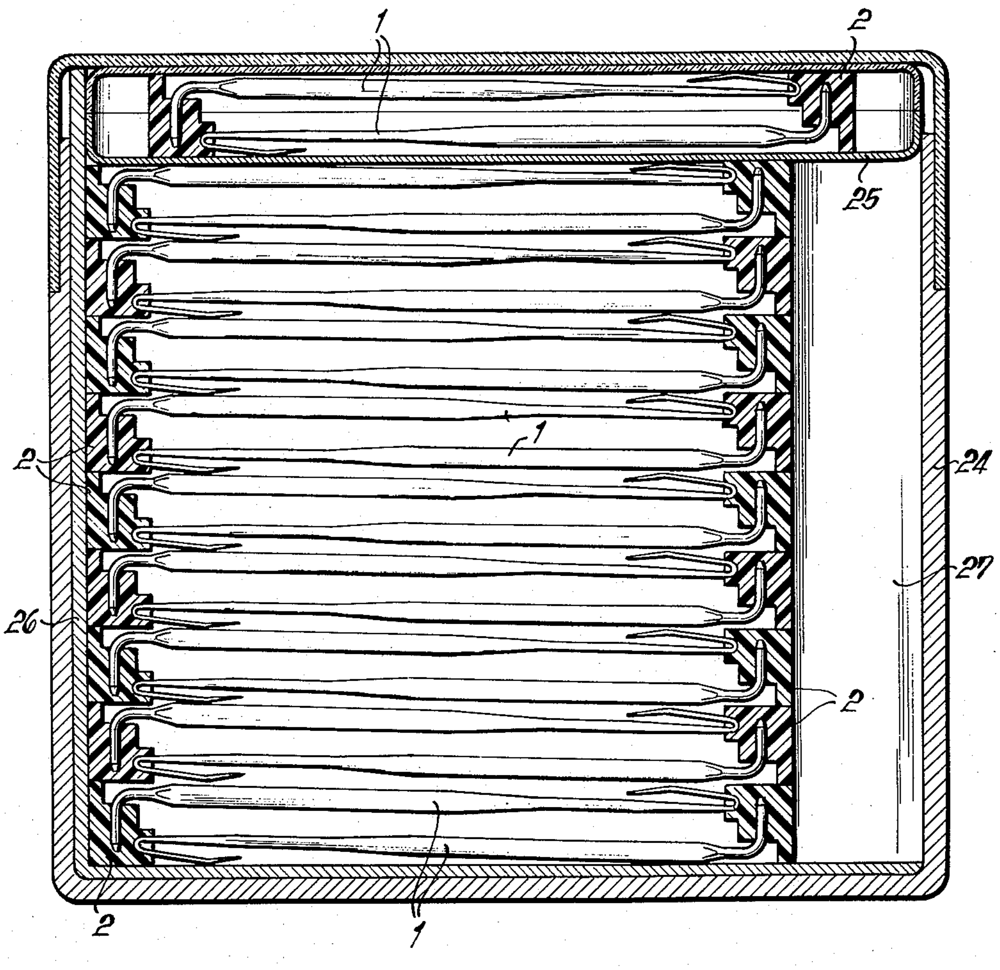
Figure 15B:
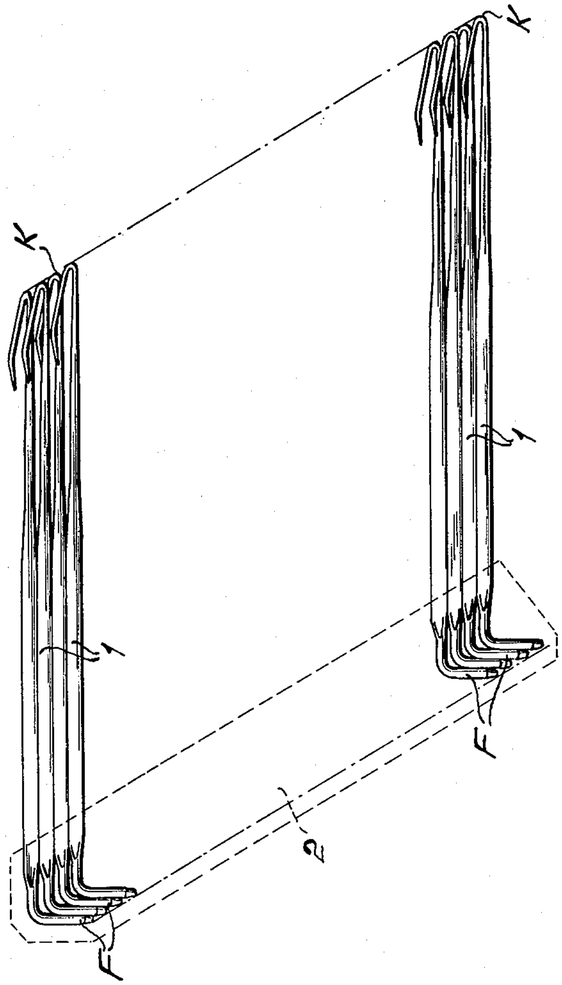
Figure 15A:
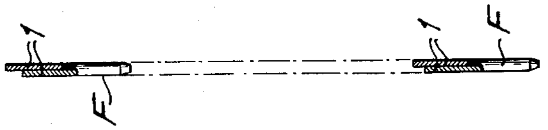

FIG. 6*b* shows a plan view of a pair of devices as illustrated in FIG. 2*a* inserted, back to back, into a transparent casing;

FIG. 7 shows, in a partly sectional side elevational view, yet a further embodiment of the device of the invention, wherein a needle is shown gripped in the device;

FIGS. 8*a*–8*b* show in a partly sectioned side elevational view and in plan view, respectively, another embodiment of the device of the present invention, wherein the resiliency of the bent over portions of the needles is made use of for holding the needles in position;

FIGS. 9*a*–9*b* show, in a partly sectioned side elevational view and in plan view, respectively, yet a further embodiment of the present invention, wherein the resiliency of the bent over portions of the needles is made use of in order to hold the needles in position;

FIGS. 10*a*–10*b* show in a sectioned side elevational view and in plan view, respectively, yet another embodiment of the device of the present invention, a pair of needle holding devices being shown attached to the hinged walls respectively of a casing;

FIGS. 11*a*–11*b* show in a sectioned side elevational view and in plan view, respectively, a needle inserted in a device attached to a hinged wall of a casing, as illustrated in FIG. 10*a*, the needle being shown inserted into a needle bar;

FIGS. 12*a*–12*b* show in a sectioned side elevational view and in plan view, respectively, another embodiment of the device according to the present invention;

FIGS. 13*a*–13*b* show in a sectioned side elevational view and in plan view, respectively, still a further embodiment of a device constructed according to the present invention, the needles being shown in position;

FIG. 14 shows, in cross-sectional, side elevational view, a container means containing several of the devices illustrated in FIG. 13*a*, together with the needles inserted therein; and FIG. 15*a* shows a cross-sectional view and FIG. 15*b* shows, in schematic view, a further embodiment of the device constructed according to the present invention.

Referring now to the drawings, FIGS. 1*a* and 1*b* illustrate one particular embodiment of the invention, a row of needles 1 being arranged in a row next to one another, and substantially parallel to one another, with the one end portion F of each needle, which portion F is bent substantially at right angles to the length of the needle, being inserted into a resilient strip 2. This strip 2 is preferably made from a thermoplastic substance such as a synthetic resin compound which is liquefied by heating and formed into the desired shape by pouring or injecting into a mold. After quick cooling, the thermoplastic substance may immediately be removed from the mold. After cooling the thermoplastic substance used remains soft, pliable and penetrable. Preferably the strip 2 is formed with a groove having a width slightly smaller than the diameter of the bent end portions F of the needles, so that the end portions F inserted in the groove are resiliently held therein. The thermoplastic substance, may however, also be poured over the portions F of the needles, when the needles are arranged as shown in FIGS. 1*a* and 1*b*, or the needles may be dipped into the liquefied thermoplastic material while it is yet in a mold. The advantage of this particular type of holding means lies in the fact that the metallic needles can be removed from the thermoplastic substance without their acquiring any residue on the surface of the needles at portion F.

FIGS. 2*a* and 2*b* show the strip 2, together with the needles arranged therein, inserted into a recess 4 formed in the holding means 3. A plate 5 is shown as rigidly connected to the holding means 3. The needles are held in the resilient strip 2, such that the opposite ends of the needles as at K, are forced against the plate 5, so that this resilient action of the strip 2 continually holds the needles in position.

It will be noted that each of the knitting needles as illustrated in the drawings is formed with a shoulder adjacent the bent over portion at the one end of the needle, and in FIG. 3, the resilient strip 2 is shown as being provided with a shoulder 6 which is adapted, after the needles are placed in position in the strip 2, to abut against the shoulders of the needles. The holding device, constituted by the holding means 3 and the plate 5, is similar to that shown in FIG. 2*a*, and the needles are thus held in position in a similar way. However, the additional shoulder 6, provided on the strip 2, prevents the lateral shifting of the needles.

FIGS. 4*a* and 4*b* illustrate a pair of elastic strips 7 which are adapted to be inserted, facing one another with a slight gap therebetween, into the recess 4 of the holding means 3 as illustrated in FIG. 2*a*. After having been inserted in the recess, the elastic strips 7 respectively engage the opposite side walls of the recess 4. The distance between the pair of elastic strips 7 is chosen to be slightly less than the average diameter of the needle and portions F, so that after these end portions F are inserted between the pair of elastic strips 7, the needles are held firmly in position. This holding action of the needles is thus very similar to the holding action of the strip 2, wherein a plurality of holes for receiving the needle end portions, is provided.

FIGS. 5*a* and 5*b* show the holding means together with the needles inserted therein, as illustrated in FIG. 2*a*, inserted into a transparent casing 8 which is adapted to receive the holding means. In this transparent casing 8, the needles are protected against any outside influences, and at the same time the needles can be continuously observed, so that if any one of the needles is bent, it is possible to immediately observe this condition, when viewing this particular needle in relation to the remaining needles in the case.

FIGS. 6*a* and 6*b* show the holding means and needles supported on plates 5, as illustrated in FIG. 2*a*, inserted into a transparent casing 9, this casing 9, being adapted to receive a pair of plate means, located back to back, that is with the plates 5 in contact with one another and the rows of needles located on opposite sides of the plates 5.

FIG. 7 shows a further embodiment of the device of the present invention. A plate 5 is rigidly connected to a holding means 3′, into which holding means a row of needles is inserted by their bent over end portions F, with their opposite end portions K resting against the plate 5. A resilient holding strip 2′ is fixed to the plate 5, substantially parallel to the holding means 3′, such that the needles, when inserted, are held resiliently between the loose connection as at 4′ and the resilient holding strip 2′. The holding strip 2′ is provided with an elongated recess into which the opposite end portions K of the needles are inserted. The resilient holding strip 2′ continuously urges the needles against the recess 4′ in the holding means 3′, so that the needles are always held in the correct, desired position. When it is desired to remove the needles, the end portion F, thereof can be lifted out of the recess 4′, and the opposite end portion K can then be pulled away from the recess provided in the resilient holding strip 2′.

FIGS. 8*a* and 8*b* show a further embodiment of the device of the present invention. This embodiment consists of a channel type holding means 13 connected rigidly, at the upper portion thereof to a frame 10, which frame is provided at its free end with a turned up portion 11. The opposite end portions K of the needles can then be gripped around this turned up portion 11, which thus constitutes an elongated deforming means for resiliently deforming portions K of the needles. This action tends to force the one end portion of each needle, as at F, downwardly against the bottom face of the channel type holding means 13, so that the needles are continuously and resiliently held in the desired position. Of course, the relative position of all the needles can continuously be observed through the cutout portions of the frame 10 as at 14.

FIGS. 9*a* and 9*b* illustrate a modification of the arrangement as shown in FIGS. 8*a* and 8*b*. The device comprises a frame 16 having an angle portion at one end, and a downwardly bent portion 18 at the other end thereof. When the bent over, opposite end portions K of the needles 1 are slipped over the downwardly bent portion 18 of the frame member 16, the needles being positioned below the frame member, the one end portions F of the needles 1 are resiliently urged upwardly, due to the gripping action of the opposite end portions K about the downwardly bent portion 18 of the frame 16. Thus, the one end portions F of the needles 1 are continuously urged upwardly against the lower surface 17 of the frame 16, so that the needles are held firmly in the desired position. Through the window 19 of the frame 16, the position of the needles, relative to one another, can be continuously observed.

FIGS. 10*a* and 10*b* show a further modification of the arrangement as shown in FIGS. 9*a* and 9*b*. A bent plate 21, is utilized as the storage means, according to the particular embodiment of the invention, the needles 1 being shown as having their bent over opposite end portions K slipped around the bent portion of the plate 21. Opposite the bent portion of the plate 21, a holding means 20 is provided, this holding means being positioned substantially parallel to the edge of the bent portion of plate 21. The holding means 20 is provided, at right angles to its length, with a plurality of grooves adapted to receive the needles 1 respectively. Due to the natural resiliency of the bent over portion of the opposite end of each needle, as at K, the needle is urged towards the holding means 20 into contact with its respective groove. It can be seen that the one end portion F of each needle extends away from the holding means 20, and is completely free. FIG. 10*a* shows how a pair of storage devices, according to this modification are located against the walls 22 of a doubly hinged casing. Thus, it can be seen that the plates 21 are firmly secured to the covers or walls 22 of the hinged casing. When the covers 22 are swung open, the free ends F of the needles are therefore immediately ready for insertion into the needle bar.

FIGS. 11*a* and 11*b* show how one of the needles inserted into the modified device and casing as illustrated in FIGS. 10*a* and 10*b*, is already placed into position in a needle bar, after the cover 22 of the casing has been swung open. Of course, if the needles are of different thickness, it is advantageous to arrange them in order of thickness along the grooved holding means 20, prior to their use. Thus, if it is desired to use a needle of a particular thickness, it can be easily selected from the needles, arranged in their order of thickness. After the bent over one end portion F of the needle 1, is inserted into the needle bar, as shown in FIG. 11*a*, the cover 22, together with the holding device and the remaining needles can be moved toward the right, as viewed in FIG. 11*a*, so that the one needle, already inserted in the needle bar is slipped off the bent portion of the plate 21, and thereby removed from the needle storage device. This therefore constitutes a very efficient and simple method for the removal of selected needles.

FIGS. 12*a* and 12*b* show a further embodiment of the device of the present invention. This embodiment is similar to that shown in FIG. 7, but in place of the resilient holding strip 2′, a securing means 2″ is provided, it being positioned across and over the row of needles 1, and secured at both ends to the plate 5, so as to firmly hold the needles in position. This securing means 2″ may be made of some adhesive material, so that when it is desired to remove the needles, the adhesive material together with the needles can be removed from the storage means and the selected needle thereafter pulled away from the adhesive securing means 2″.

FIGS. 13*a* and 13*b* illustrate yet another modification of the device of the present invention. A pair of rows of needles 1 are arranged in parallel planes respectively, the rows of needles being arranged with their bent over one end portions F located opposite the opposite end portions K, respectively, the end portions F being respectively inserted into a pair of resilient holding means 2‴, and the opposite pointed end portions K being respectively embedded in small recesses 12 provided in the side walls of the resilient holding means 2‴. It will be noted that the pair of resilient holding means 2‴ are located substantially parallel to one another and displaced from one another a distance substantially equal to the length of the needles 1, so that by the nature of the arrangement, each needle is securely, and resiliently located between the pair of resilient holding means 2‴.

FIG. 14 illustrates how a number of devices identical to those illustrated in FIG. 13, are contained within a large container 24. The top storage device is shown contained within a transparent casing 25, so that when the container 24 is opened, the top casing 25 will first come readily to hand. After all the needles contained in the case 25 have been used, this casing can then be filled with one of the needle bunches located below in the container 24. All the bunches of needles are supported on a common angle piece 26, so that they can easily be lifted out of the container 24, if desired. The space 27 in the container 24 can be filled with a suitable filling piece so as to prevent displacement of the bunches of needles.

FIGS. 15*a* and 15*b* illustrate a further embodiment of the invention, wherein the end portions F of the needles are located such that the outer edge of each end portion F is in engagement with the inner edge of the end portion F of the adjacent needle, in each case. It is therefore obvious that each bent over opposite end portion K will overlap the succeeding bent over opposite end portion K of the next needle in the row. Thus, it will be noted that the row of needles will collectively take on the form of a parallelogram. The ends F of the needles are embedded in the resilient holding means 2, and can be removed therefrom without there being any residue of the substance 2 remaining on the needles 1. The advantage of this particular modification of the invention lies in the fact that many needles can be located together with the saving of a considerable amount of space.

It will be understood that each of the elements described above, or two or more together, may also find a useful application in other types of needle storage devices differing from the types described above.

While the invention has been illustrated and described as embodied in a needle storage device including resilient holding means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A needle storage device for storing needles of equal lengths, each needle having one end portion bent at an angle to the length of the needle, and an opposite pointed end portion bent over substantially parallel to the length of the needle, said storage device comprising, in combination, a first elongated resilient strip of soft pliable material; a second elongated resilient strip parallel to said first elongated resilient strip and displaced therefrom a distance substantially equal to the length of said needles; a first row of needles arranged in a plane, said needles in said first row being substantially parallel to one another, said one end portion of each of said needles in said first row being removably embedded in said first resilient strip, and the opposite pointed end portion of each of said needles in said first row being removably embedded in said second resilient strip; and a second row of needles arranged in a plane substantially parallel to the plane of said first row of needles, said needles in said second row being substantially parallel to one another, said one end portion of each of said needles in said second row being removably embedded in said second resilient strip, and said opposite pointed end portion of each of said needles in said second row being embedded in said first resilient strip.

2. A cotton frame needle storage package comprising, in combination, a plurality of cotton frame needles having each a folded-over end portion at one end and a bent end portion at the other end extending at substantially 90° to the straight portion of the needle located between said end portions, said needles being arranged with their straight portions substantially in a single plane and in substantially side abutting relation and with said bent end portions thereof in alignment; and holding means having two engaging portions spaced from each other substantially the length of the straight portions of said needles, at least one of said engaging portions including an elongated strip of pliable plastic material formed with a straight groove extending transverse to the direction of the straight portions of said needles and in which one of the sets of end portions projects removable therefrom only in the direction of the longitudinal extension of said one end portion and the other of said engaging portions including engaging means engaging the set of the other end portions of said needles in such a manner as to impede removal of said one set of end portions from said groove in said one direction.

3. A cotton frame needle storage package comprising, in combination, a plurality of cotton frame needles having a folded-over end portion at one end and a bent end portion at the other end extending at substantially 90° to the straight portion of the needle located between said end portions, said needles being arranged with their straight portions substantially in a single plane and in substantially side abutting relation and with said bent end portions thereof in alignment; and holding means having two engaging portions spaced from each other substantially the length of the straight portions of said needles, one of said engaging portions including an elongated strip of pliable plastic material formed with a groove extending in longitudinal direction of said strip and substantially normal to the straight portions of said needles and opening transversely to said single plane in which said straight portions of said needles are located and in which said bent end portions of said needles project, and the other of said engaging portions including engaging means anchoring the folded-over end portions of said needles against movement transversely to said single plane in which said straight portions of said needles are located.

4. A cotton frame needle storage package comprising, in combination, a plurality of cotton frame needles having each a folded-over end portion at one end and a bent end portion at the other end extending at substantially 90° to the straight portion of the needle located between said end portions, said needles being arranged with their straight portions substantially in a single plane and in substantially side abutting relation and with said bent end portions thereof in alignment; and holding means having two engaging means spaced from each other substantially the length of the straight portions of said needles, one of said engaging means including an elongated casing strip of rigid material formed with an elongated recess extending in longitudinal direction of said casing strip and a strip of pliable plastic material located in said recess and formed with a straight groove extending transverse to the direction of the straight portions of said needles and in which one of the sets of end portions projects removable therefrom only in the direction of the longitudinal extension of said one end portion and the other of said engaging means including a thin plate fixed to said elongated casing strip and extending therefrom in the direction of the straight portion of said needles and engaging the other set of end portions thereof in such a manner as to impede removal of said one set of end portions from said groove in said one direction.

5. A cotton frame needle storage package comprising, in combination, a plurality of cotton frame needles having each a folded-over end portion at one end and a bent end portion at the other end extending at substantially 90° to the straight portion of the needle located between said end portions, said needles being arranged with their straight portions substantially in a single plane and in substantially side abutting relation and with said bent end portions thereof in alignment; and holding means having two engaging means spaced from each other substantially the length of the straight portions of said needles, one of said engaging means including an elongated casing strip of rigid material formed with an elongated recess extending in longitudinal direction of said casing strip and a strip of pliable plastic material located in and substantially filling said recess and formed with a straight groove extending transverse to the direction of the straight portions of said needles and opening transversely to said single plane in which said straight portions of said needles are located and in which said bent portions of said needles project removable therefrom only in the direction of the longitudinal extension of said bent end portions and the other of said engaging means including a thin plate fixed to said elongated casing strip and extending therefrom in the direction of the straight portions of said needles and engaging the folded-over end portions thereof in such a manner as to resiliently deform said straight portions of said needles to securely hold said bent end portions thereof in said groove.

6. A cotton frame needle storage package comprising, in combination, a plurality of cotton frame needles having each a folded-over end portion at one end and a bent end portion at the other end extending at substantially 90° to the straight portion of the needle located between said end portions, said needles being arranged with their straight portions substantially in a single plane and in substantially side abutting relation and with said bent end portions thereof in alignment; holding means having two engaging means spaced from each other substantially the length of the straight portions of said needles, one of said engaging means including an elongated casing strip of rigid material formed with an elongated recess extending in longitudinal direction of said casing strip and a strip of pliable plastic material located in and substantially filling said recess and formed with a straight groove extending transverse to the direction of the straight portions of said needles and opening transversely to said single plane in which said straight portions of said needles are located and in which said bent portions of said needles project removable therefrom only in the direction of the longitudinal extension of said bent end portions and the other of said engaging means including a thin plate fixed to said elongated casing strip and extending therefrom in the direction of the straight portions of said needles and engaging the folded-over end portions thereof in such a manner as to resiliently deform said straight portions of said needles to securely hold said bent end portions thereof in said groove; and frame means attached to said casing strip and enclosing said plurality of needles and said plate.

7. A cotton frame needle storage package comprising, in combination, two sets of cotton frame needles having each a folded-over end portion at one end and a bent end portion at the other end extending at substantially 90° to the straight portion of the needle located between said end portions, said two sets of needles being arranged in two rows with the needles in each row substantially parallel to and substantially abutting each other and said two rows arranged with said straight portions of said needles in two first planes substantially parallel and closely spaced from each other and with said bent end portions of said needles in said two rows located respectively in two substantially parallel spaced second planes substantially normal to said two first planes and said bent end portions in each of said rows of needles projecting in the same direction and opposite to the direction in which the bent end portions of the other row of needles project; holding means including two elongated casing strips of rigid material arranged spaced from and substantially parallel to each other and each formed with an elongated recess extending in longitudinal direction of said casing strip and a strip of pliable material located in said recess and formed with a straight groove extending transverse to the direction of straight portions of said needles and the sets of bent end portions of said two rows of needles extending respectively into said grooves, and a thin plate extending between said elongated casing strips and between said two rows of needles and being fastened at opposite edge portions thereof to said elongated casing strips, respectively, and engaging said folded-over end portions of said two rows of needles; and frame means attached to said elongated casing strips and covering said two rows of needles.

8. A cotton frame needle storage package comprising, in combination, a plurality of cotton frame needles having each a folded-over end portion at one end and a bent end portion at the other end extending at substantially 90° to the straight portion of the needle located between said end portions, said needles being arranged with their straight portions substantially in a single plane and closely adjacent to each other and with said bent end portions thereof in alignment; and holding means having two engaging portions spaced from each other substantially the length of the straight portions of said needles, one of said engaging portions including a straight recess extending transverse to the direction of said straight portions of said needles and opening transversely to said single plane in which said straight portions of said needles are located and said bent end portions of said needles projecting in said recess, and the other of said engaging portions including engaging means anchoring the folded-over end portions of said needles against movement transversely to said single plane in which said straight portions of said needles are located.

9. A cotton frame needle storage package comprising, in combination, a plurality of cotton frame needles having each a folded-over end portion at one end and a bent end portion at the other end extending at substantially 90° to the straight portion of the needle located between said end portions, said needles being arranged with their straight portions substantially in a single plane and closely adjacent to each other and with said bent end portions thereof in alignment; and holding means having two engaging portions spaced from each other substantially the length of the straight portions of said needles, one of said engaging portions including a straight recess extending transverse to the direction of said straight portions of said needles and opening transversely to said single plane in which said straight portions of said needles are located and said bent end portions of said needles projecting in said recess, and the other of said engaging portions including engaging means engaging the folded-over end portions of said needles so as to impede removal of said bent end portions from said recess.

10. A cotton frame needle storage package comprising, in combination, a plurality of cotton frame needles having each a folded-over end portion at one and a bent end portion at the other end extending at substantially 90° to the straight portion of the needle located between said end portions, said needles being arranged closely adjacent to each other with their straight portions substantially in a single plane and with said bent end portions thereof in alignment; and holding means including a strip of pliable plastic material extending substantially normal to said straight portions of said needles in the region of one set of end portions removable therefrom without leaving any residue of said material on said needles.

11. An arrangement as defined in claim 10, in which said strip is formed from a melt-dip substance having a basic of synthetic resin compound.

12. A cotton frame needle storage package comprising, in combination, a plurality of cotton frame needles having each a folded-over end portion at one end and a bent end portion at the other end extending at substantially 90° to the straight portion of the needle located between said end portions, said needles being arranged closely adjacent to each other with their straight portions substantially in a single plane and with said bent end portions thereof in alignment; and holding means having two engaging portions spaced from each other substantially the lengths of said straight portions of said needles, at least one of said engaging portions including a strip of pliable plastic material extending substantially normal to said straight portions of said needles in the region of one set of end portions thereof and embedding said one set of end portions removable therefrom without leaving any residue of said material on said needles, and the other of said engaging portions engaging the other set of end portions of said needles in such a manner so as to impede removal of said one set of end portions from said strip.

References Cited in the file of this patent

UNITED STATES PATENTS

| | | |
|---|---|---|
| 926,478 | Franke | June 29, 1909 |
| 964,406 | Dewitt | July 12, 1910 |
| 1,210,513 | Medearis | Jan. 2, 1917 |
| 1,926,916 | Reeves | Sept. 12, 1933 |
| 2,005,674 | Gastrich | June 18, 1935 |
| 2,228,493 | Will | Jan. 14, 1941 |
| 2,279,426 | Walsh | Apr. 14, 1942 |
| 2,590,358 | Williams | Mar. 25, 1952 |
| 2,628,711 | Flannery | Feb. 17, 1953 |
| 2,644,324 | Spencer | July 7, 1953 |
| 2,692,676 | Grover | Oct. 26, 1954 |
| 2,776,744 | Cook | Jan. 8, 1957 |
| 2,797,806 | Davis | July 2, 1957 |
| 2,823,436 | Karalus | Feb. 18, 1958 |